UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

BORATED INSECTICIDE FERTILIZER.

943,669. Specification of Letters Patent. Patented Dec. 21, 1909.

No Drawing. Application filed March 26, 1909. Serial No. 486,050.

*To all whom it may concern:*

Be it known that I, CARLETON ELLIS, citizen of the United States, residing at Larchmont, in the county of Westchester and State of New York, have invented certain new and useful Improvements in Borated Insecticide Fertilizers, of which the following is a specification.

This invention relates to an insecticide and particularly to a dry pulverulent material, having as its basis, waste-lime borax material obtained as a by-product in the manufacture of borax.

In the preparation of insecticides, it is customary to mix an insecticidal body such as paris green and the like with flour or other filling and extending material. In order to cheapen the cost of such preparation, I make use of a waste material which carries boracic compounds having considerable insecticidal value. For this purpose, I preferably employ sludges having about the compositions shown below, one of these being a typical sulfate of lime sludge and the other a typical carbonate of lime sludge.

*Sulfate Sludge.*

| | |
|---|---|
| Lime | 37.28% |
| Sulfuric acid anhydrous | 51.40% |
| Silica | 4.48% |
| Alumina and iron oxid | 1.59% |
| Anhydrous boric acid | 2.10% |
| Magnesia | .24% |
| Water | 2.91% |

*Carbonate Sludge.*

| | |
|---|---|
| Silica | 8.67% |
| Alumina | 1.81% |
| Oxid of iron | .35% |
| Lime | 45.84% |
| Magnesia | 2.75% |
| Anhydrous boric acid | 2.36% |
| Carbonic acid (anhydrous) | 33.85% |
| Sodium oxid | 1.16% |
| Water | 2.02% |

Small amounts of chlorids and sulfates.

From the foregoing, it will be seen that a considerable proportion of boracic material is present and I find that these bodies are especially advantageous not only for their insecticidal properties but also to prevent the burning of vegetation by the arsenical compounds commonly used for the purpose. As is well known, paris green and arsenate of lime and the like often burn the vegetation due probably to the presence of arsenical material in too soluble form. In admixture with the lime-borax waste this burning action is not in evidence.

A suitable formula illustrative of my invention consists of 96 parts of lime-borax waste, 5 parts of paris green and 1 part of lead arsenate. Another formula consists of 90 parts of lime-borax waste, 8 parts of lead arsenate and 2 parts of lime arsenate. Another formula consists of 94 parts of lime-borax waste and 6 parts of copper arsenate. Still another formula consists of 94 parts lime-borax waste, 4 parts of paris green, and 2 parts of lime arsenate. A very simple composition is made by mixing 5 parts of paris green with 45 parts of sulfate lime waste and 40 parts of carbonate lime waste.

Iron oxid or other coloring matter may be added if desired.

In order to give the insecticide fertilizing properties, fertilizing salts such as sulfate or nitrate of ammonia, sulfate or chlorid of potash, phosphate of ammonium, phosphate or superphosphate of lime, etc., may be added.

The lime sludges may be treated by a precipitation process so as to form the arsenical or other insecticidal body on the particles of the sludge material, adding for example, a solution of soda arsenate to the sludge, and then introducing the solution containing sufficient sulfate of copper to precipitate the arsenate on the particles of the sludge. The sludge may then be dried or if desired may first be washed to remove the sulfate of soda and then dried.

Other materials may be incorporated with the compositions above indicated or with the lime sludge material alone as for example, the solid condensation product of creosote with formaldehyde, or such salts as fluorid of sodium or potash.

A mixture of lime-borax waste 50 parts, ground zinc oxid 40 parts and ammonium sulfate 3 parts, ammonium chlorid 3 parts and potassium sulfate 4 parts makes a fairly effective insecticide which possesses fertilizing properties.

While other filling and extending materials may be employed in conjunction with the borax waste including other sludge materials, I prefer to use this material as the principal component.

The composition is preferably applied in the dry powder form by dusting over the plant leaves. Its property of adhering to vegetation is marked and is an advantage of some moment as powders not possessing this property are often removed by wind or rain before destruction of insects is complete.

Having described my invention to the details of which description I do not wish to limit myself, what I claim is:—

1. An insecticide comprising the herein described waste lime borax material and an arsenical.

2. An insecticide consisting of the herein described waste lime borax material and an arsenical, all in a pulverulent form.

3. An insecticide comprising the herein described waste lime borax material, a metallic arsenate and a soluble fertilizing body, all in a powder form.

In testimony whereof I have affixed my signature in presence of two witnesses.

CARLETON ELLIS.

Witnesses:
NATHANIEL L. FOSTER,
JOHN H. DERBY, Jr.